Patented Apr. 16, 1940

2,197,604

UNITED STATES PATENT OFFICE 2,197,604

WHITE COMPOSITE PIGMENT AND PAINT AND METHOD OF MAKING SAME

Louis E. Barton, Windsor, Conn.

No Drawing. Original application May 24, 1937, Serial No. 144,484. Divided and this application June 7, 1937, Serial No. 146,861

4 Claims. (Cl. 23—110)

My invention relates generally to pigments, their preparation and application, and more specifically to a new type of white composite pigments comprising combinations of the oxides of lead, zinc, aluminum and silicon together with improved methods of making same and their application in paints.

In my co-pending application for patent Serial No. 144,484 filed in the United States Patent Office May 24, 1937, of which this is a division, I have described a general process of making composite pigments which, briefly described, consists in heating mixtures of at least three oxides of the group comprising the oxides of lead, zinc, aluminum and silicon to temperatures sufficiently high to combine them, but without fusion of the charge. In the application referred to I have described briefly various groups of composite pigments which can be made by the process, including as group IV the lead zinc alumino-silicates, and it is the object of this application to describe that group more in detail.

Before giving detailed examples of my method of making lead zinc alumino-silicates, I shall give a general description of materials and details of process.

As a source of the various oxides, I may use the oxides as such, or any compounds of the elements which will yield the oxides upon heating. For example, as a source of lead oxide I can use either litharge (PbO) or red lead ($Pb_3O_4$) or lead peroxide ($PbO_2$) or white lead ($2PbCO_3 \cdot PbH_2O_2$). As a source of zinc oxide I may use the oxides as such or compounds such as zinc sulphate. In products which are to contain both lead and zinc the so-called leaded zinc oxides are available. As a source of aluminum oxide I may use alumina ($Al_2O_3$) or such compounds as aluminum hydrate or aluminum nitrate. As a source of silica I may use either the natural finely-powdered material or the artificially prepared silica in either anhydrous or hydrated form. In cases where the pigment is to contain both silica and alumina I have found it economical and advantageous to use natural aluminum silicate or china clay in which the alumina and silica are already in chemical combination, but in such cases the clay should be carefully selected, and substantially free from impurities which may detrimentally effect the whiteness or color.

I first thoroughly mix the materials in the required proportions either by dry-milling or, preferably, by wet-milling, thereby reducing particle size and also assuring a very close association of the ingredients. The milling may be done either in a batch or a continuous type of mill; in either case by using a porcelain or silex lining to avoid contamination of materials.

The slurry from the wet-mill is dewatered as by settling and decantation and/or filtration. Any suitable equipment may be used, such as Dorr tanks and filter presses.

If desired the charge can be prepared in conjunction with the separation of aluminum hydrate from sodium aluminate solutions by such well-known methods as the Bayer process of seeding the aluminate solution with aluminum hydrate and then agitating, or by precipitation of the aluminum hydrate by passing carbon dioxide gas into the solution. It is only necessary to suspend the other oxides, which are to be components of the product, in the sodium aluminate solution and precipitate the aluminum hydrate as usual while agitating the charge. The thoroughly blended mixed precipitate is then separated from the alkaline liquor and the precipitate thoroughly washed.

The wet pulp, prepared by either of the methods outlined above, is then charged directly into the heating furnace, or it may be preliminarily dried and then charged into the furnace. The furnace may be either of the batch type such as a muffle, hearth furnace or Bruckner furnace, or of the continuous kiln type. In either case a lining of high-grade fire brick is satisfactory to avoid contamination of materials. In furnaces where products of combustion contact the charge, a neutral or oxidizing flame should be maintained to avoid possible reduction of metallic oxides.

The time required in the calcining zone depends upon the temperature. The higher the temperature, within the permissible range, the shorter the time. Suitable time and temperature conditions for the various products will be indicated later in detailed examples, but such preferred temperature ranges should not be construed as limiting the process, since lower temperatures could be used by heating for a longer period and in some cases higher temperatures could be used, though there is a tendency to poorer colors and textures.

Some of my new composite pigments are sufficiently fine, as discharged from the calcining furnace, if care has been used not to exceed the upper temperature limit for the particular product, to be used as pigments for paints, but usually milling is required to break down aggregates and also to reduce particle size.

Either dry or wet-drilling methods may be used with or without air separation or wet classification respectively, thereby assuring uniformity of product. If wet-milling has been employed, the slurry is dewatered, dried, and if necessary passed through a disintegrator to break down lumps and aggregates.

In general I find it desirable to proportion my composite pigments to give definite molecular chemical compounds, but the rule is not invariable for I have found in some cases that very small amounts of one oxide with a preponderance of others has a determining effect. I have also found it desirable in some cases to proportion the compound to obtain maximum effect of one or more oxide in proportion to the total. Thus, where maximum opacity or hiding power is desired the lead and/or zinc oxides should be as high as permissible since the refractive indices of alumina and silica are such that they contribute very little to the opacity of the compound when it is mixed with such vehicles as linseed oil. In cases where one of the constituents is in large excess there may possibly be present in the product more than one definite chemical compound and some of that oxide may be present in solid solution or possibly as free oxide.

The determination of constitution of my lead zinc alumino-silicates is complicated by the fact that alumina, while acidic in relation to lead and zinc oxides, is basic in respect to silica as, for example, in aluminum silicate or china clay which, as before stated, I may use as a raw material. Where the definitely basic oxides of lead and zinc are present with alumina and silica they doubtless combine chemically with both alumina and silica to form a product containing both aluminates and silicates. Such combinations I regard as alumino-silicates and so refer to them in this specification.

The following examples will serve to illustrate the working of my process and indicate a few of the variations that are possible.

EXAMPLE I.—*Lead zinc alumino-silicate,* $PbO \cdot ZnO \cdot Al_2O_3 \cdot 2SiO_2$ or $PbZnAl_2Si_2O_9$ A mixture of 157 parts of aluminum hydrate, equivalent to 102 parts of aluminum oxide, 120 parts of silica, 223 parts of lead oxide, PbO, and 81.4 parts of zinc oxide was thoroughly blended by wet-milling and the charge dewatered and dried. The dried mixture was then calcined for 1½ hours at a temperature of 650° C.

The product was a fine white powder having a soft texture. The tinting strength was 70 compared to white lead standard taken as 100 and the oil absorption of 20.5 parts of oil per 100 parts of pigment. The chemical composition as indicated by the molecular formula was:

| | |
|---|---|
| Lead oxide, (PbO) per cent | 42.4 |
| Zinc oxide do | 15.5 |
| Aluminum oxide do | 19.4 |
| Silica do | 22.8 |
| Specific gravity | 5.30 |

EXAMPLE II

A mixture of 100 parts of lead oxide, PbO, 100 parts of zinc oxide, 50 parts of aluminum oxide and 50 parts of silica was thoroughly blended by wet-milling for 4 hours and the charge then dewatered and dried. The dried charge was calcined for 2 hours at 700° C. then wet-milled for 1½ hours and dewatered and dried.

The product had a specific gravity of 5 and the following chemical composition:

| | |
|---|---|
| Lead oxide, (PbO) per cent | 33.33 |
| Zinc oxide do | 33.33 |
| Aluminum oxide do | 16.67 |
| Silica do | 16.67 |

The pigment had an excellent white color; soft texture; oil absorption 22.5 parts of oil per 100 parts of pigment and a tinting strength of 75 compared with white lead standard taken as 100.

EXAMPLE III

A mixture of 87.6 parts of lead oxide, PbO, 31.5 parts of zinc oxide, 123 parts of aluminum hydrate, equivalent to 80 parts of aluminum oxide, and 10 parts of silica were thoroughly blended by wet-milling for 2 hours and the charge dewatered and dried. The dried charge was calcined for 2 hours at a temperature of 850 to 900° C. then wet-milled and dried.

The specific gravity of the product was 5.26 and the chemical composition:

| | |
|---|---|
| Lead oxide, (PbO) per cent | 41.50 |
| Zinc oxide do | 14.90 |
| Aluminum oxide do | 37.80 |
| Silica do | 5.80 |

The pigment had an excellent white color; soft texture; oil absorption of 20.4 parts of oil per 100 parts of pigment and a tinting strength of 70 compared with white lead standard taken as 100.

EXAMPLE IV.—*Lead zinc alumino-silicate,* $PbO \cdot ZnO \cdot Al_2O_3 \cdot 2SiO_2$ or $PbZnAl_2Si_2O_9$ A mixture of 120 parts of silica, 223 parts of lead oxide, PbO, and 81.4 parts of zinc oxide was suspended in a solution of sodium aluminate containing 185 parts of actual sodium aluminate, equivalent to 102 parts of $Al_2O_3$, in 2000 parts of water. Carbon dioxide gas, $CO_2$, was then passed into the suspension until the alumina was completely precipitated. The mixed precipitate was separated by filtration and washing, dried and then calcined for 1½ hours at a temperature of 650° C.

The product was a fine white powder having a soft texture. The tinting strength was 80 compared to white lead standard taken as 100. The product had a specific gravity of 5.22.

The properties of my lead zinc alumino-silicate pigments are such as to adapt them for use in various applications such as oil, enamel and lacquer type coatings and for other purposes such as rubber, linoleum and other floor coverings, vitrified enamels et cetera, but their outstanding characteristic is their property of imparting durability to paints for exterior exposure when the pigments, either alone or in admixture with other pigments, are used in a vehicle such as linseed oil.

The lead zinc almino-silicates have sufficient opacity or hiding power to make both white and tinted paints but are particularly useful in combination with the highly opaque titanium pigments, which used alone in paints are less durable when exposed to the weather.

I claim as my invention:

1. A new white pigment consisting essentially of the chemically combined oxides of lead, zinc, aluminum and silicon.

2. The method of making an opaque white pigment composed of lead, zinc, aluminum and silicon oxides which consists in heating an intimate mixture of the said oxides in the temperature range 650° C. to 900° C. until they chemically combine in the solid phase without fusion to form said pigment.

3. The method of making an opaque white pigment composed of the oxides of lead, zinc, aluminum and silicon which consists in intimately mixing compounds of lead, zinc, aluminum and silicon, which upon heating supply to the product only the oxides, and then heating the mixture in the temperature range 650° C. to 900° C. until the said oxides chemically combine in the solid phase without fusion to form said pigment.

4. The method of making an opaque white pigment composed of the oxides of lead, zinc, aluminum and silicon which consists in intimately mixing compounds of lead, zinc, aluminum and silicon, which upon heating supply to the product only the oxides, and then heating the mixture in the temperature range of 650° C. to 700° C. until the said oxides chemically combine in the solid phase without fusion to form said pigment.

LOUIS E. BARTON.